US012494535B2

(12) United States Patent
Deng et al.

(10) Patent No.: US 12,494,535 B2
(45) Date of Patent: Dec. 9, 2025

(54) BATTERY ASSEMBLY AND PREPARATION METHOD, BATTERY AND ELECTRIC VEHICLE

(71) Applicants: Microvast Power Systems Co., Ltd., Huzhou (CN); Microvast, Inc., Stafford, TX (US)

(72) Inventors: Guoyou Deng, Huzhou (CN); Yong Jin, Huzhou (CN); Xiaojie Shen, Huzhou (CN); Yu Yao, Huzhou (CN); Xiaofeng Yin, Huzhou (CN); Yang Wu, Honolulu, HI (US)

(73) Assignees: MICROVAST POWER SYSTEMS CO., LTD., Huzhou (CN); MICROVAST, INC., Stafford, TX (US)

( * ) Notice: Subject to any disclaimer, the term of this patent is extended or adjusted under 35 U.S.C. 154(b) by 187 days.

(21) Appl. No.: 17/694,708

(22) Filed: Mar. 15, 2022

(65) Prior Publication Data

US 2023/0299396 A1    Sep. 21, 2023

(51) Int. Cl.
*H01M 50/179*  (2021.01)
*H01M 50/184*  (2021.01)
*H01M 50/188*  (2021.01)
*H01M 50/342*  (2021.01)
*H01M 50/55*   (2021.01)
*H01M 50/559*  (2021.01)
*H01M 50/567*  (2021.01)

(52) U.S. Cl.
CPC ....... *H01M 50/179* (2021.01); *H01M 50/184* (2021.01); *H01M 50/188* (2021.01); *H01M 50/3425* (2021.01); *H01M 50/55* (2021.01); *H01M 50/559* (2021.01); *H01M 50/567* (2021.01); *H01M 2220/20* (2013.01)

(58) Field of Classification Search
CPC ............. H01M 50/179; H01M 50/184; H01M 50/188; H01M 50/3425; H01M 50/55; H01M 50/559; H01M 50/567; H01M 2220/20
See application file for complete search history.

(56) References Cited

U.S. PATENT DOCUMENTS

2023/0344097 A1* 10/2023 Chai ................... H01M 50/249

FOREIGN PATENT DOCUMENTS

| CN | 102347512 A | 2/2012 |
| CN | 112290133 A | 1/2021 |

(Continued)

OTHER PUBLICATIONS

International Search Report of PCT Patent Application No. PCT/CN2022/109818 issued on Nov. 28, 2022.

*Primary Examiner* — Matthew T Martin
*Assistant Examiner* — Grace Ann Kenlaw
(74) *Attorney, Agent, or Firm* — Andrew C. Cheng

(57) ABSTRACT

Provided is a battery assembly, which includes a cover plate and a pole. The pole penetrates the cover plate and is fixed with the cover plate by riveting. For the battery assembly provided by the application, the pole and the cover plate are fixed by riveting. Compared with the fixing method of welding, it not only simplifies the fixing operation, improves the production efficiency, but also reduces the production cost. Also provided are a preparation method of a battery assembly, a battery and an electric vehicle.

11 Claims, 10 Drawing Sheets

(56) References Cited

FOREIGN PATENT DOCUMENTS

| | | | |
|---|---|---|---|
| CN | 113314808 A | | 8/2021 |
| CN | 113346201 A | | 9/2021 |
| CN | 113991186 A | * | 1/2022 |
| CN | 215988973 U | | 3/2022 |

* cited by examiner

BATTERY ASSEMBLY AND PREPARATION METHOD, BATTERY AND ELECTRIC VEHICLE

TECHNICAL FIELD

The application relates to the technical field of batteries, and in particular, to a battery assembly and a preparation method thereof, a battery and an electric vehicle.

BACKGROUND

With the development of electronic technology, lithium-ion battery has been widely used because of its advantageous such as high specific power, long cycle life, good safety performance, low pollution, etc. Lithium-ion battery can be divided into cylindrical battery, square housing battery and soft pack battery according to its shape. Among them, cylindrical battery has attracted more and more attention, and is more and more widely used.

The existing cylindrical battery generally includes housing, cover plate and cell. The positive connection terminal and negative connection terminal of the existing cylindrical battery are respectively arranged at the opposite ends of the cylindrical battery, which limits the group technology of the battery and affects the battery layout and battery energy density. Since the positive connection terminal and the negative connection terminal are respectively arranged at the opposite ends of the cylindrical battery, when the battery is connected in series and in parallel to form a group, the batteries must be placed according to the polarity requirements, which not only increases the risk of error battery placement, but also increases the number of structural parts, makes the wiring design more complex, increases the production cost and reduces the energy density of the batteries. Moreover, the current collecting plate of the existing cylindrical battery has a long electrical connection path with the pole and a small contact area, resulting in poor thermal conductivity. Therefore, the existing cylindrical battery needs to be improved in structure so as to solve the problems of battery arrangement complexity in group and production cost, and improve the heat dissipation performance and sealing performance of the battery.

SUMMARY

The object of the application is to provide a battery assembly and a battery, so as to solve or at least partially solve the shortcomings of the above background technology. The pole and the cover plate are fixed by riveting. Compared with the fixing method of welding, it not only simplifies the fixing operation, improves the production efficiency, but also reduces the production cost.

An embodiment of the application provides a battery assembly, which includes a cover plate and a pole, wherein the pole penetrates the cover plate and is fixed with the cover plate by riveting.

In one realizable way, the cover plate is provided with a through hole, the pole includes a main body and a first end and a second end respectively located at opposite ends of the main body, the main body is inserted in the through hole, the first end and the second end protrude in opposite directions to the outside of the through hole from the main body; the cover plate, the first end and the second end are riveted, and the riveting part of the cover plate is located between the first end and the second end.

In one realizable way, the first end of the pole is provided with a stopping part, the second end of the pole is formed with a flange; the stopping part, flange and the cover plate are riveted, and the riveting part of the cover plate is located between the stopping part and the flange.

In one realizable way, the battery assembly further includes a pressing block, the pressing block participates in riveting, that is, the pressing block, the pole and the cover plate are riveted; the pressing block is arranged at the first end and/or the second end of the pole.

In one realizable way, the pressing block has an annular structure, and the pressing block is sleeved on the first end and/or the second end of the pole.

In one realizable way, the first end or the second end of the pole is formed with a flange, the pressing block is arranged on the pole near the flange, and the pressing block is located between the flange and the cover plate; or, the first end or the second end of the pole is provided with a stopping part, the pressing block is arranged on the pole near the stopping part, and the pressing block is located between the stopping part and the cover plate.

In one realizable way, the battery assembly further includes an insulating sealing ring, the insulating sealing ring is sleeved on the pole, and the insulating sealing ring is used for insulation and sealing between the pole and the cover plate.

In one realizable way, the battery assembly further includes a first current collecting plate, and the first current collecting plate is electrically connected with the pole.

In one realizable way, the first current collecting plate includes a plate body and an electrical connection part, the electrical connection part is formed by protruding from the plate body towards the pole, and the electrical connection part is electrically connected with the pole.

In one realizable way, the pole is provided with a central hole, the electrical connection part is inserted into the central hole, and the electrical connection part is electrically connected with the pole.

In one realizable way, a side wall of the electrical connection part is in contact with an inner wall of the central hole to realize the electrical connection between the electrical connection part and the pole.

In one realizable way, the battery assembly further includes a sealing sheet, the sealing sheet is hermetically connected with the pole, and the sealing sheet seals the central hole of the pole.

In one realizable way, the pole is a positive pole or a negative pole.

Another embodiment of the application further provides a battery, which includes the battery assembly described above.

In one realizable way, the battery further includes a housing, at least one end of the housing is provided with an opening, the cover plate is used to seal the opening of the housing, the opposite ends of the pole are respectively located outside the opening of the housing and inside the opening of the housing.

In one realizable way, the battery further includes a first current collecting plate, a second current collecting plate and a cell, and the first current collecting plate, the second current collecting plate and the cell are all arranged in the housing, two sides of the first current collecting plate are electrically connected with the top end of the cell and the pole respectively, and two sides of the second current collecting plate are electrically connected with the bottom end of the cell and the housing respectively.

In one realizable way, two sides of the first current collecting plate are respectively in contact with the top end of the cell and the pole to realize the electrical connection, and two sides of the second current collecting plate are respectively in contact with the bottom end of the cell and the housing to realize the electrical connection.

In one realizable way, the first current collecting plate may be a positive current collecting plate or a negative current collecting plate, the second current collecting plate may also be a positive current collecting plate or a negative current collecting plate. When the first current collecting plate is a positive current collecting plate, the second current collecting plate is a negative current collecting plate; on the contrary, when the first current collecting plate is a negative current collecting plate, the second current collecting plate is a positive current collecting plate.

Another embodiment of the application further provides an electric vehicle, which includes the battery described above.

Another embodiment of the application further provides a preparation method of a battery assembly, which includes:
 providing a cover plate and a pole;
 penetrating the pole through the cover plate; and
 fixing the pole with the cover plate by riveting.

In one realizable way, the cover plate is provided with a through hole, the pole has a first end and a second end arranged opposite to each other, and the first end of the pole is provided with a stopping part;
 said penetrating the pole through the cover plate includes:
 inserting the pole into the through hole of the cover plate until the second end of the pole penetrates the cover plate; and
 said fixing the pole with the cover plate by riveting includes:
 mechanically pressing the second end of the pole to form a flange, such that the pole is fixed with the cover plate by the riveting, and the stopping part and the flange cooperate with each other to clamp the cover plate therebetween.

For the battery assembly provided by the application, the pole and the cover plate are fixed by riveting. Compared with the fixing method of welding, it not only simplifies the fixing operation, improves the production efficiency, but also reduces the production cost.

DETAILED DESCRIPTION OF PREFERRED EMBODIMENTS

Specific embodiments of the application are further described in detail below in combination with the accompanying drawings. The following embodiments are used to illustrate the application, but are not used to limit the scope of the application.

The terms "first", "second", "third", "fourth" and the like (if any) involved in the description and claims of the application are used to distinguish similar objects, and are not used to describe a specific order or sequence.

The spatial terms "up", "down", "left", "right", "front", "back", "top", "bottom" and the like (if any) involved in the description and claims of the application are defined by the positions of the structures in the figures and the positions between the structures, only for the clarity and convenience of expressing the technical solution. It should be understood that the use of these spatial terms should not limit the scope of the application.

As shown in FIGS. 1A to 4, a battery assembly provided in a first embodiment of the application includes a cover plate 2 and a pole 3. The pole 3 penetrates the cover plate 2 and is fixed with the cover plate 2 by riveting.

Specifically, in this embodiment, the pole 3 and the cover plate 2 are fixed by riveting. Compared with the welding method, it not only simplifies the operation and improves the production efficiency, but also reduces the production cost.

As shown in FIGS. 1A to 3, in one embodiment, the cover plate 2 is provided with a through hole 21. The pole 3 includes a main body 30A and a first end 30B and a second end 30C respectively located at opposite ends of the main body 30A. The main body 30A is inserted in the through hole 21. The first end 30B and the second end 30C protrude in opposite directions to the outside of the through hole 21 from the main body 30A. In this embodiment, the first end 30B protrudes upward from the main body 30A, and the second end 30C protrudes downward from the main body 30A. The cover plate 2, the first end 30B and the second end 30C are riveted, and the riveting part of the cover plate 2 is located between the first end 30B and the second end 30C.

Figure 1A:
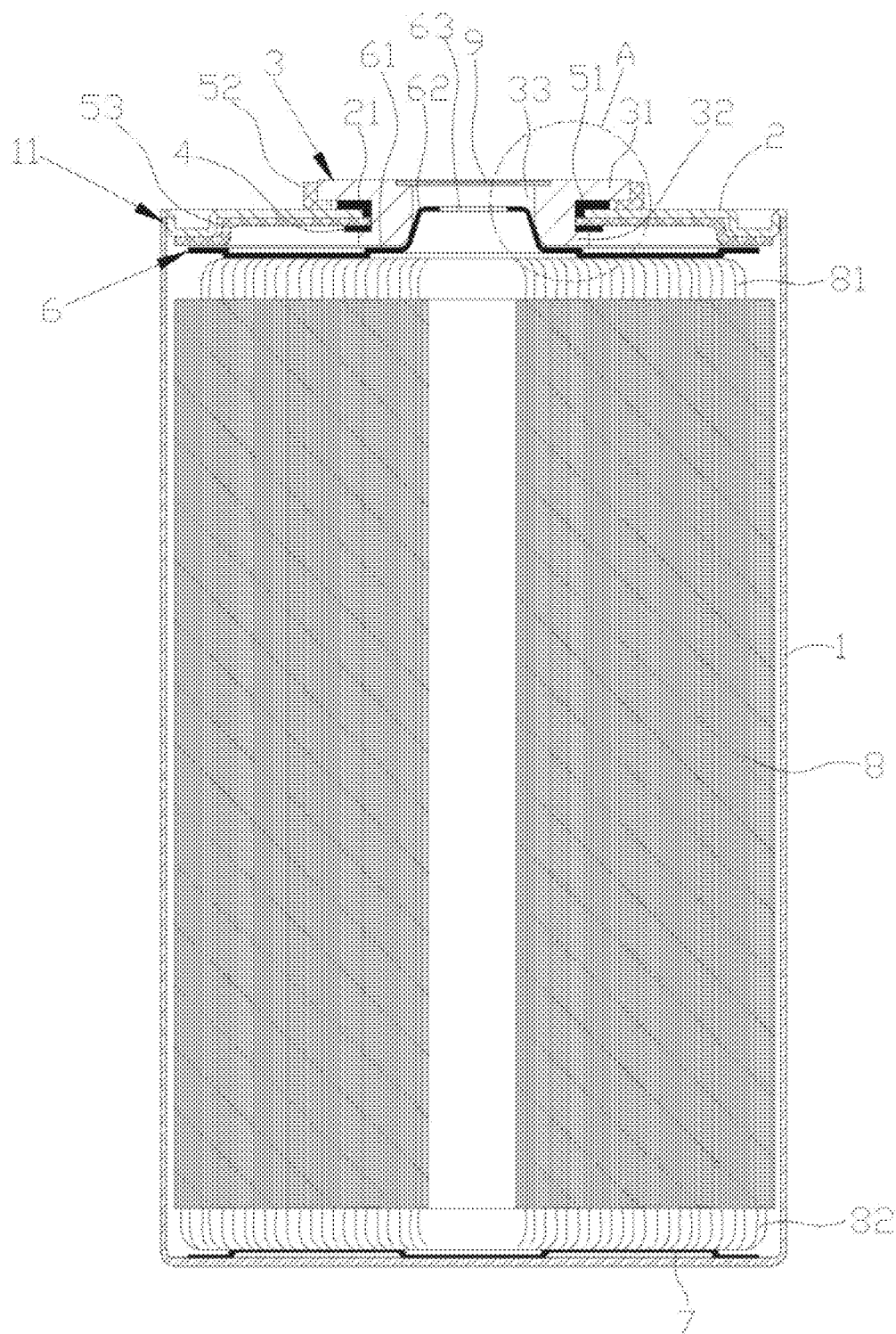
FIG. 1A is a schematic cross-sectional view of a battery assembly in a first embodiment of the application.
Figure 1B:
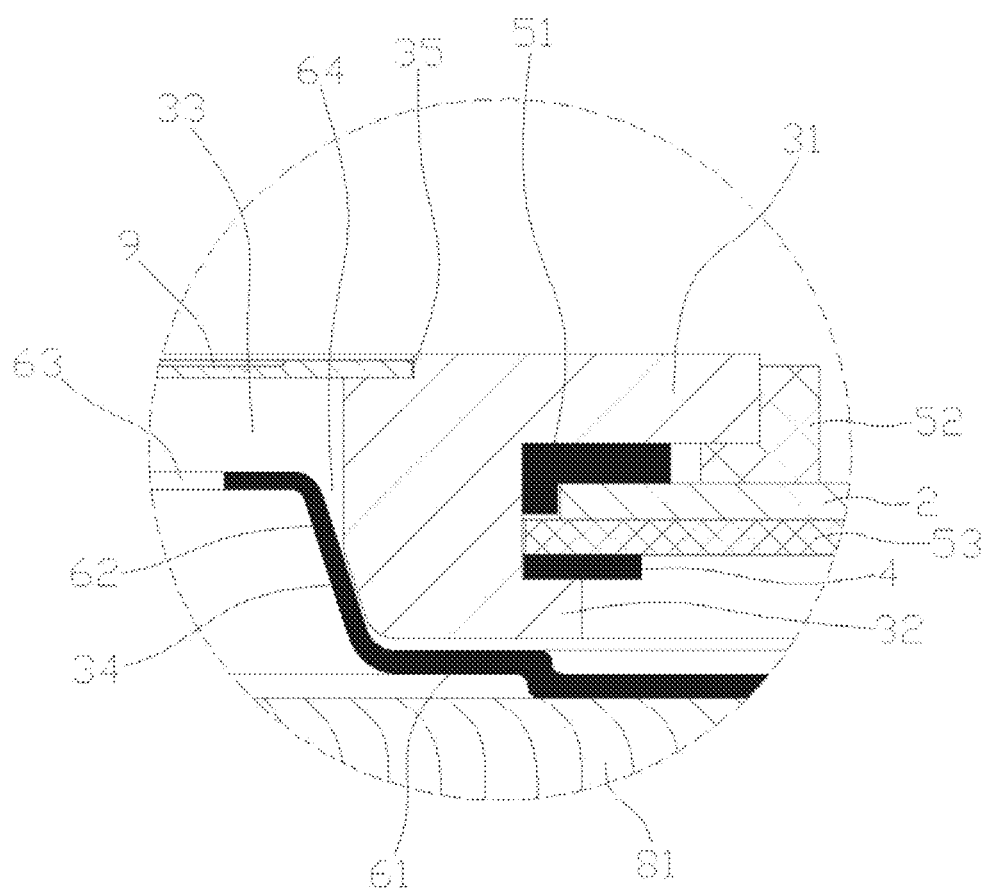
FIG. 1B is an enlarged view of the portion A in FIG. 1A.
Figure 2:
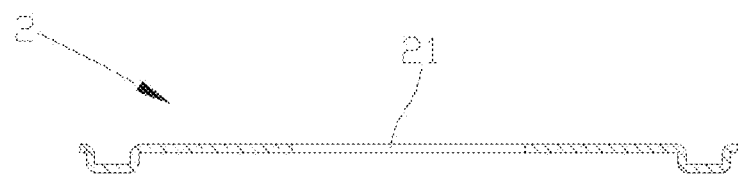
FIG. 2 is a schematic cross-sectional view of the cover plate in FIG. 1.

As shown in FIGS. 1A and 1B, in one embodiment, the battery assembly further includes a pressing block 4. The pressing block 4 participates in the riveting, that is, the pressing block 4, the pole 3 and the cover plate 2 are riveted. The pressing block 4 is arranged at the first end 30B and/or the second end 30C of the pole 3. During the riveting, the pressing block 4 is clamped by the pole 3.

Specifically, in this embodiment, the pressing block 4 may be an aluminum block. Of course, in other embodiments, the pressing block 4 may also be made of other materials.

As shown in FIGS. 1A and 1B, in one embodiment, the pressing block 4 is arranged at the second end 30C of the pole 3 (that is, the pressing block 4 is filled at the lower end of the pole 3). Of course, in other embodiments, the pressing block 4 may also be arranged at the first end 30B of the pole 3, or be arranged at the first end 30B and the second end 30C of the pole 3 simultaneously.

As shown in FIGS. 1A and 1B, in one embodiment, the pressing block 4 has an annular structure, and the pressing block 4 is sleeved on the second end 30C of the pole 3. Of course, in other embodiments, the pressing block 4 may also be sleeved on the first end 30B of the pole 3, or be sleeved on the first end 30B and the second end 30C of the pole 3 simultaneously.

As shown in FIGS. 1A and 1B, in one embodiment, the pole 3 has a T-shaped structure. The first end 30B of the pole 3 is provided with a stopping part 31. The stopping part 31 is formed by protruding radially outward from the side wall of the pole 3, and the stopping part 31 is located on one side of the cover plate 2. The second end 30C of the pole 3 is formed with a flange 32. The flange 32 is formed by protruding radially outward from the side wall of the pole 3, and the flange 32 is located on the other side of the cover plate 2. In the radial direction of the pole 3, the diameter of the stopping part 31 is greater than that of the flange 32.

The stopping part 31, the flange 32 and the cover plate 2 are riveted, and the riveting part of the cover plate 2 is located between the stopping part 31 and the flange 32. Of course, in other embodiments, the second end 30C of the pole 3 may be provided with the stopping part 31, and the first end 30B of the pole 3 is formed with the flange 32.

Specifically, in this embodiment, the stopping part 31 is provided at the top of the pole 3, the stopping part 31 is located above the cover plate 2, and the stopping part 31 is located outside the housing 1. The flange 32 is provided at the bottom of the pole 3, the flange 32 is located below the cover plate 2, and the flange 32 is located inside the housing 1.

As shown in FIGS. 1A and 1B, in one embodiment, the pressing block 4 is sleeved on the pole 3 near the flange 32, and the pressing block 4 is located between the flange 32 and the cover plate 2. During the riveting, the pressing block 4 is clamped by the flange 32. Of course, in other embodiments, the pressing block 4 may also be sleeved on the pole 3 near the stopping part 31, in which case the pressing block 4 is located between the stopping part 31 and the cover plate 2.

Figure 3:
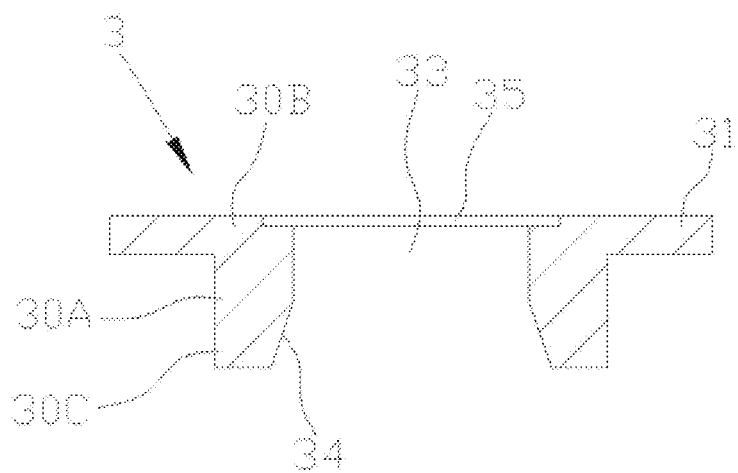
FIG. 3 is a schematic cross-sectional view of the pole in FIG. 1.

Specifically, as shown in FIGS. 1A, 1B and 3, the stopping part 31 is a part of the pole 3 itself (that is, the stopping part 31 exists before the pole 3 and the cover plate 2 are riveted), while the flange 32 is formed during the process when the pole 3 and the cover plate 2 are riveted (that is, the flange 32 does not exist before the pole 3 and the cover plate 2 are riveted). Specifically, as shown in FIGS. 1A and 1B, in this embodiment, when the pole 3 and the cover plate 2 are riveted, the pole 3 of the T-shaped structure is first inserted into the through hole 21 of the cover plate 2 from top to bottom, and then the lower end of the pole 3 is mechanically pressed (e.g., by rotary riveting), so as to flatten the lower end of the pole 3 to form the flange 32. In the process of pressing and flattening the lower end of the pole 3 to form the flange 32, an upsetting effect will be formed on the pole 3 (that is, the length of the pole 3 is shortened and the diameter of the pole 3 is increased), so that the pole 3 and the cover plate 2 are fixed, so as to realize the riveting of the pole 3 and the cover plate 2. Each of the stopping part 31 and the flange 32 has a limiting function, and the stopping part 31 and the flange 32 cooperate with each other to firmly clamp the cover plate 2 to prevent the pole 3 from falling off from the through hole 21 of the cover plate 2. At the same time, when the pole 3 and the cover plate 2 are riveted, the insulating sealing ring 51 is compressed during the formation of the flange 32, so that the gap between the stopping part 31 and the cover plate 2 is completely filled by the insulating sealing ring 51, so as to improve the sealing performance of the battery.

Figure 4:
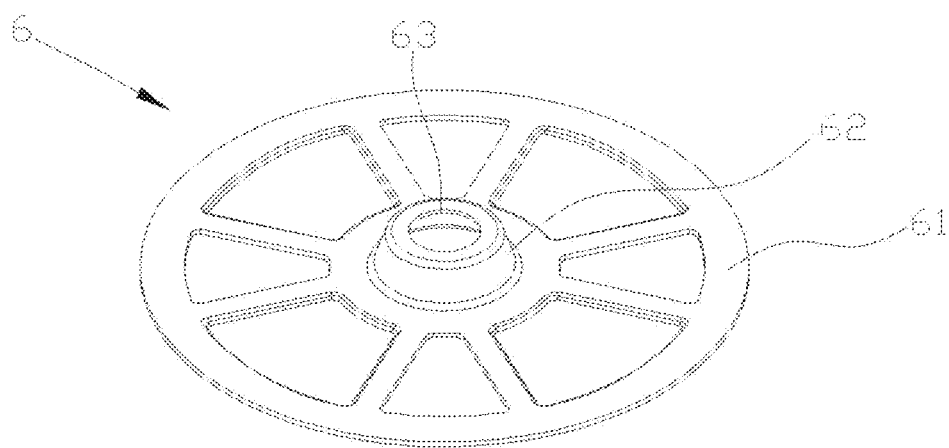
FIG. 4 is a three-dimensional structural diagram of the first current collecting plate in FIG. 1.

As shown in FIGS. 1A, 1B and 4, in one embodiment, the battery assembly further includes a first current collecting plate 6. The first current collecting plate 6 is located on one side of the cover plate 2 near the cell 8. The first current collecting plate 6 is in contact with the pole 3 to realize the electrical connection between the first current collecting plate 6 and the pole 3.

As shown in FIGS. 1A, 1B and 4, in one embodiment, the first current collecting plate 6 includes a plate body 61 and an electrical connection part 62. The electrical connection part 62 is formed by protruding from the plate body 61 towards the pole 3. The plate body 61 is in contact with the end face of the cell 8. The electrical connection part 62 is in contact with the pole 3 to realize the electrical connection between the electrical connection part 62 and the pole 3.

As shown in FIGS. 1A, 1B and 4, in one embodiment, the pole 3 is provided with a central hole 33, the electrical connection part 62 is inserted into the central hole 33, and the electrical connection part 62 is electrically connected with the pole 3.

Specifically, the side wall of the electrical connection part 62 is in contact with the inner wall of the central hole 33 to realize the electrical connection between the electrical connection part 62 and the pole 3.

Figure 5:
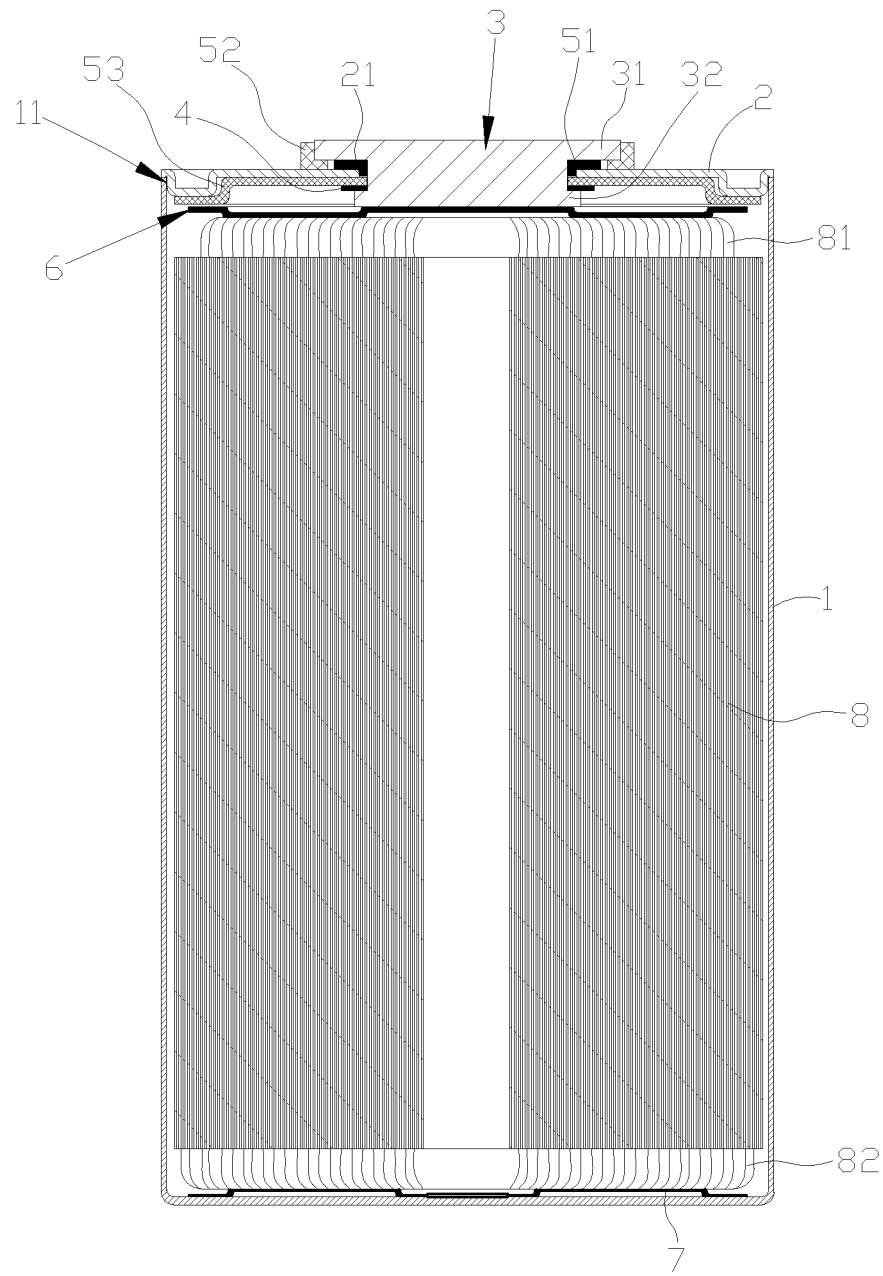
FIG. 5 is a schematic cross-sectional view of a battery assembly in a second embodiment of the application.

Specifically, in this embodiment, the electrical connection part 62 has a circular cross section, and the electrical connection part 62 has a structure of hollow truncated cone with gradually reduced diameter along the direction toward the pole 3. As shown in FIGS. 1A, 1B and 3-4, the inner wall of the central hole 33 is provided with an inclined surface 34 at the second end 30C of the pole 3, the electrical connection part 62 is inserted into the central hole 33, and an outer peripheral wall of the electrical connection part 62 is in contact with the inclined surface 34 of the central hole 33 to realize the electrical connection between the electrical connection part 62 and the pole 3. By setting the electrical connection part 62 on the first current collecting plate 6, the contact area between the first current collecting plate 6 and the pole 3 is increased, so that the heat generated inside the cell 8 can be quickly conducted from the pole 3, so as to avoid the thermal runaway caused by large heat generation of the cell 8 during high rate charge and discharge. Of course, as shown in FIG. 5, in other embodiments, the first current collecting plate 6 may also be a flat disc-shaped structure.

As shown in FIGS. 1A and 1B, specifically, a lower portion of the outer peripheral wall of the electrical connection part 62 is in contact with the inclined surface 34 of the central hole 33 to realize the electrical connection between the electrical connection part 62 and the pole 3, while an upper portion of the outer peripheral wall of the electrical connection part 62 is spaced from the inner wall of the central hole 33 to form a V-shaped groove 64 therebetween.

As shown in FIGS. 1A and 1B, in one embodiment, the battery assembly further includes an insulating sealing ring 51. The insulating sealing ring 51 is sleeved on the pole 3 and located near the stopping part 31, and the insulating sealing ring 51 is used for insulation and sealing between the pole 3 and the cover plate 2.

As shown in FIGS. 1A and 1B, in one embodiment, the insulating sealing ring 51 is at least partially arranged in the through hole 21, and the insulating sealing ring 51 is located between the outer wall of the pole 3 and the inner wall of the through hole 21.

Specifically, in this embodiment, the insulating sealing ring 51 has a T-shaped structure (of course, in other embodiments, the insulating sealing ring 51 may also be an O-shaped structure). A portion of the insulating sealing ring 51 is located in the through hole 21 (i.e., between the outer wall of the pole 3 and the inner wall of the through hole 21), and another portion of the insulating sealing ring 51 is located on the outer side of the cover plate 2 and sandwiched between the stopping part 31 and the cover plate 2, so that the insulating sealing ring 51 can have a good sealing effect on the sealing between the pole 3 and the cover plate 2, and can insulate the pole 3 from the cover plate 2 to prevent the pole 3 from electrically conducting with the cover plate 2. At the same time, when the pole 3 and the cover plate 2 are riveted, in the process of pressing the pole 3 and upsetting the pole 3, the stopping part 31 will compress the insulating sealing ring 51, so that the insulating sealing ring 51 is firmly clamped between the stopping part 31 and the cover plate 2, so as to further improve the sealing effect.

As shown in FIGS. 1A and 1B, in one embodiment, the battery assembly further includes an insulating ring 52. The insulating ring 52 is provided between the stopping part 31 and the cover plate 2, and the insulating ring 52 is used to insulate the pole 3 from the cover plate 2, so as to prevent the pole 3 from electrically conducting with the cover plate 2.

Specifically, in this embodiment, the insulating sealing ring 51 is a small ring structure with a central opening while the insulating ring 52 is a large ring structure with a central opening, and the insulating ring 52 is arranged around the periphery of the insulating sealing ring 51.

As shown in FIGS. 1A and 1B, in one embodiment, the battery assembly further includes an insulating gasket 53. The insulating gasket 53 is provided between the pressing block 4 and the cover plate 2.

Specifically, in this embodiment, a portion of the insulating gasket 53 is located between the pressing block 4 and the cover plate 2, and another portion of the insulating gasket 53 is located between the first current collecting plate 6 and the cover plate 2, so as to prevent the pressing block 4 from electrically conducting with the cover plate 2 and also prevent the first current collecting plate 6 from electrically conducting with the cover plate 2.

As shown in FIGS. 1A, 1B and 3-4, in one embodiment, a first opening 35 is provided at the first end 30B of the pole 3 such that the central hole 33 is capable of communicating with the external environment through the first opening 35. A second opening 63 is provided at an end face of the electrical connection part 62, and the second opening 63 communicates an interior of the electrical connection part 62 with the central hole 33.

As shown in FIGS. 1A and 1B, in one embodiment, the battery assembly further includes a sealing sheet 9. The sealing sheet 9 may be an explosion-proof sheet. The sealing sheet 9 is hermetically connected with the top surface of the pole 3, and the sealing sheet 9 seals the central hole 33 of the pole 3.

As shown in FIG. 5, a battery assembly provided in a second embodiment of the application is basically the same as the battery assembly in the first embodiment, except that the structures of the pole 3 and the first current collecting plate 6 are different. Specifically, in this embodiment, the first current collecting plate 6 is a flat disc-shaped structure, the pole 3 is a solid block (i.e., the central hole 33 is not provided in the pole 3), and the first current collecting plate 6 is in contact with the bottom surface of the pole 3.

Figure 6:
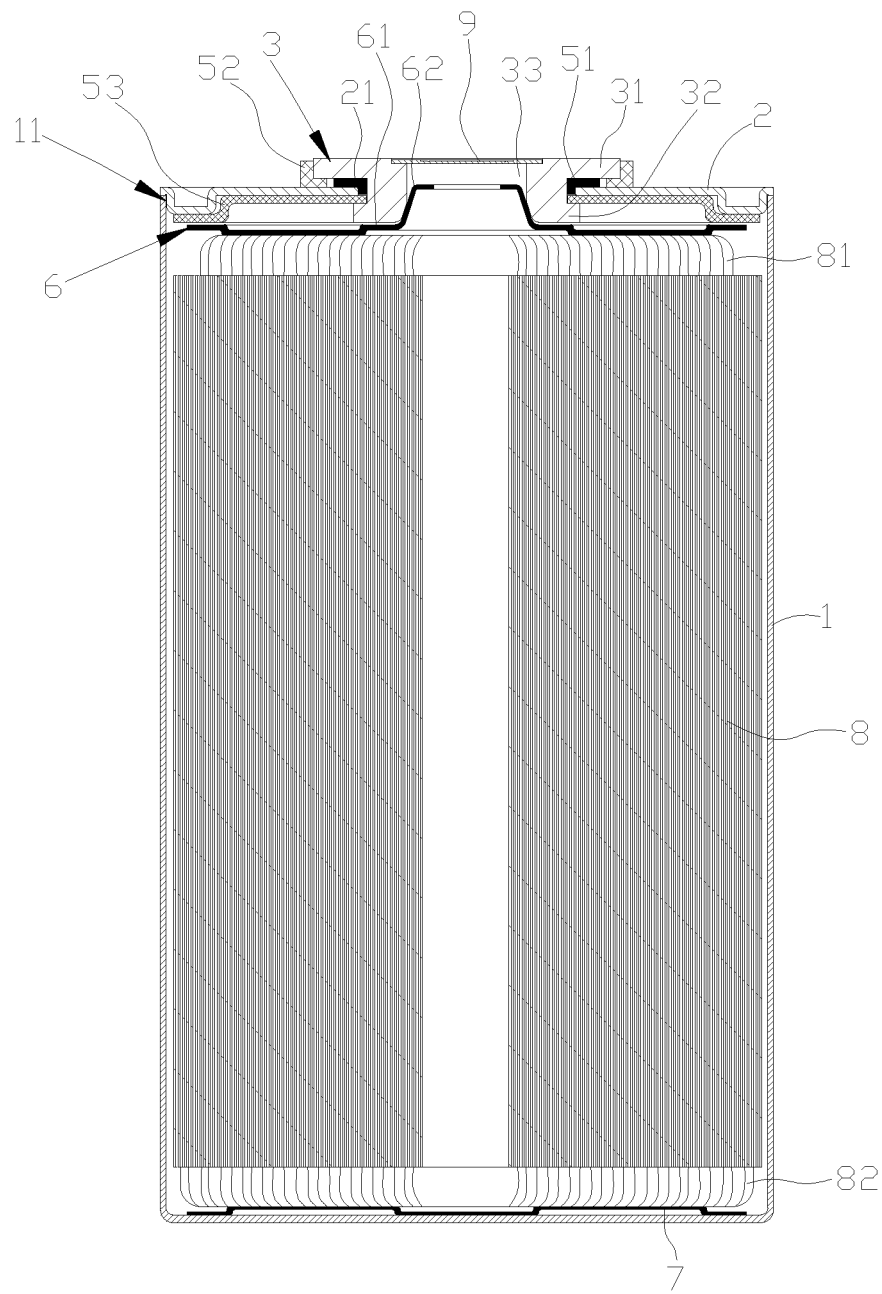
FIG. 6 is a schematic cross-sectional view of a battery assembly in a third embodiment of the application.

As shown in FIG. 6, a battery assembly provided in a third embodiment of the application is basically the same as the battery assembly in the first embodiment, except that the pressing block 4 is not provided on the pole 3. Therefore, the insulating gasket 53 is directly clamped between the flange 32 and the cover plate 2.

Figure 7:
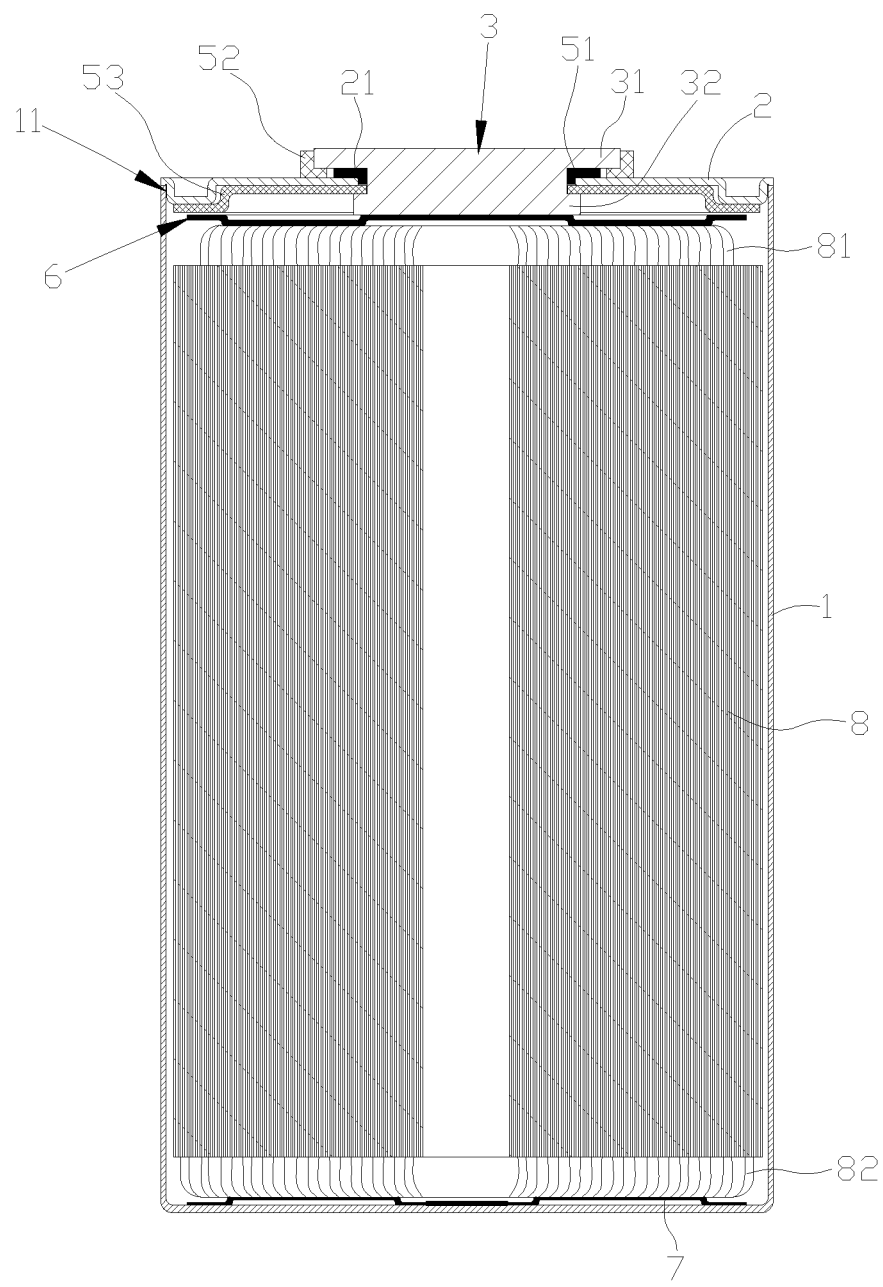
FIG. 7 is a schematic cross-sectional view of a battery assembly in a fourth embodiment of the application.

As shown in FIG. 7, a battery assembly provided in a fourth embodiment of the application is basically the same as the battery assembly in the first embodiment, except that the structures of the pole 3 and the first current collecting plate 6 are different, and the pressing block 4 is not provided on the pole 3. Specifically, in this embodiment, the first current collecting plate 6 is a flat disc-shaped structure, the pole 3 is a solid block (i.e., the central hole 33 is not provided in the pole 3), and the first current collecting plate 6 is in contact with the bottom surface of the pole 3. Furthermore, the insulating gasket 53 is directly clamped between the flange 32 and the cover plate 2.

Figure 8:
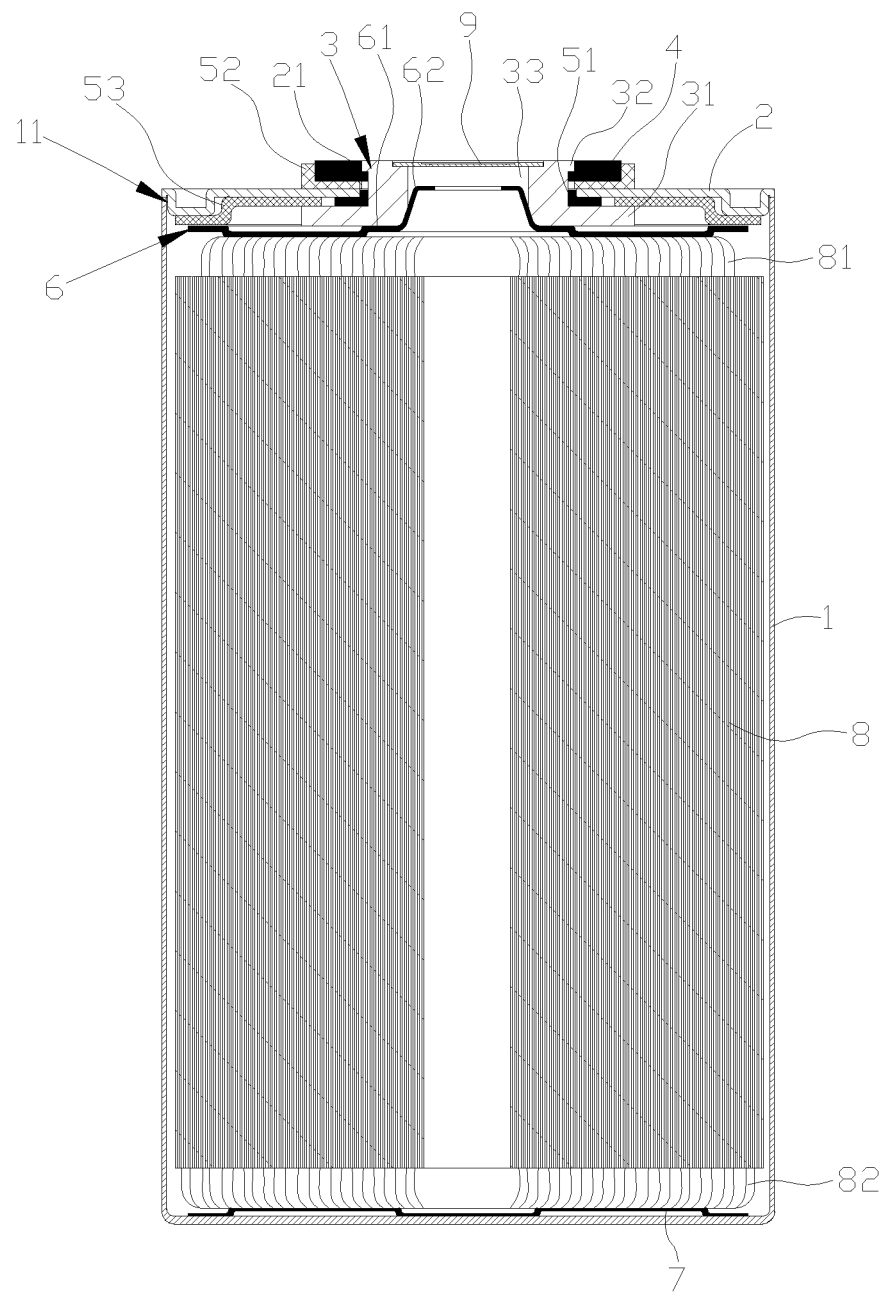
FIG. 8 is a schematic cross-sectional view of a battery assembly in a fifth embodiment of the application.

As shown in FIG. 8, a battery assembly provided in a fifth embodiment of the application is basically the same as the battery assembly in the first embodiment, except that the structure of the pole 3 is different, and the positions of the pressing block 4 and the insulating sealing ring 51 are different. Specifically, in this embodiment, the pole 3 has an inverted T-shaped structure, the stopping part 31 is provided at the bottom of the pole 3, the stopping part 31 is located below the cover plate 2, and the stopping part 31 is located inside the housing 1. The pressing block 4 is filled at the upper end of the pole 3. The pressing block 4 is clamped between the flange 32 and the insulating ring 52, and the insulating ring 52 is clamped between the pressing block 4 and the cover plate 2. A portion of the insulating sealing ring 51 is located in the through hole 21 (i.e., between the outer wall of the pole 3 and the inner wall of the through hole 21), and another portion of the insulating sealing ring 51 is located on the inner side of the cover plate 2 and sandwiched between the stopping part 31 and the cover plate 2. In this embodiment, when the pole 3 and the cover plate 2 are riveted, the pole 3 of the inverted T-shaped structure is first inserted into the through hole 21 of the cover plate 2 from bottom to top, and then the upper end of the pole 3 is mechanically pressed, so as to flatten the upper end of the pole 3 to form the flange 32. The stopping part 31 and the flange 32 cooperate with each other to firmly clamp the cover plate 2, so that the pole 3 and the cover plate 2 are fixed, so as to realize the riveting of the pole 3 and the cover plate 2.

Figure 9:
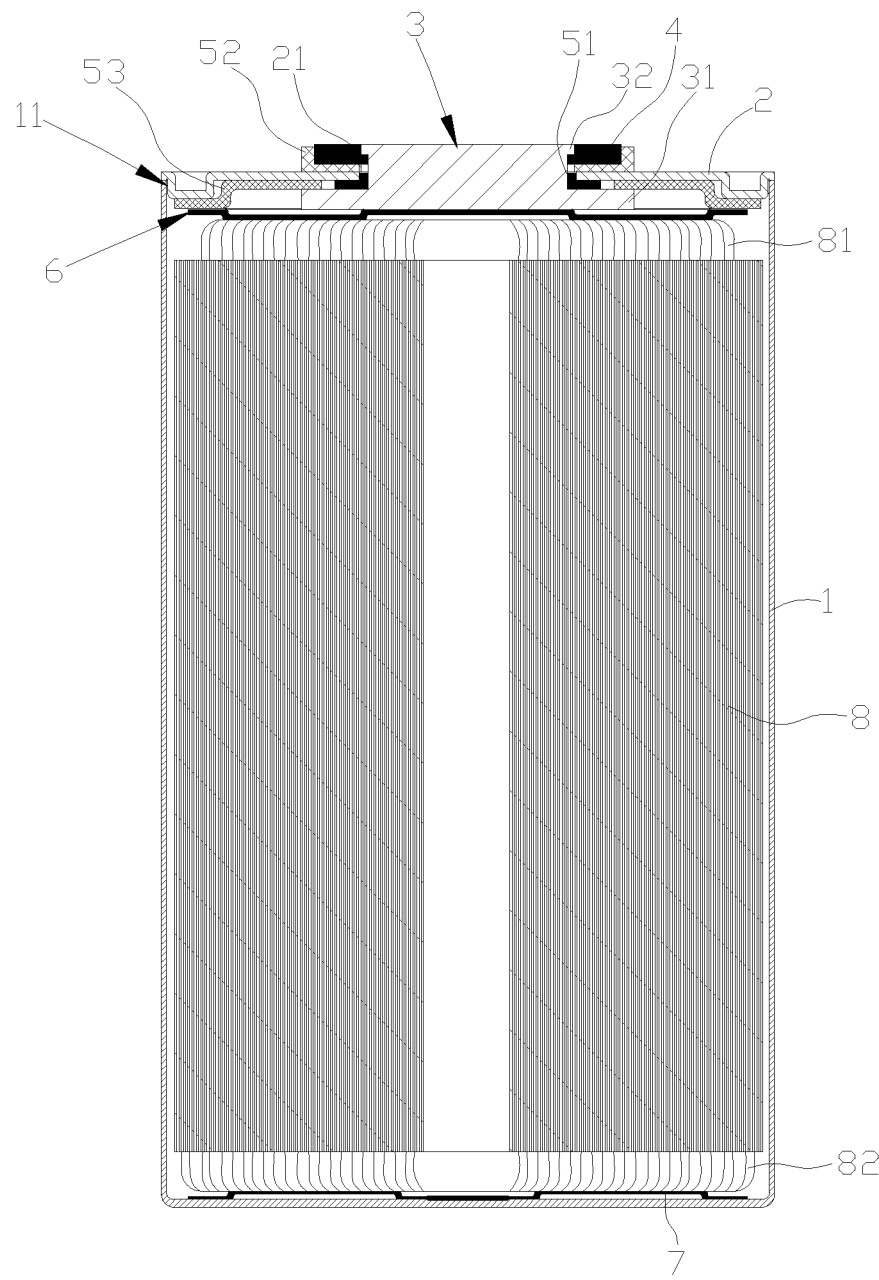
FIG. 9 is a schematic cross-sectional view of a battery assembly in a sixth embodiment of the application.

As shown in FIG. 9, a battery assembly provided in a sixth embodiment of the application is basically the same as the battery assembly in the fifth embodiment, and the pole 3 also has an inverted T-shaped structure, except that the structures of the pole 3 and the first current collecting plate 6 are different. Specifically, in this embodiment, the first current collecting plate 6 is a flat disc-shaped structure, the pole 3 is a solid block (i.e., the central hole 33 is not provided in the pole 3), and the first current collecting plate 6 is in contact with the bottom surface of the pole 3.

Figure 10:
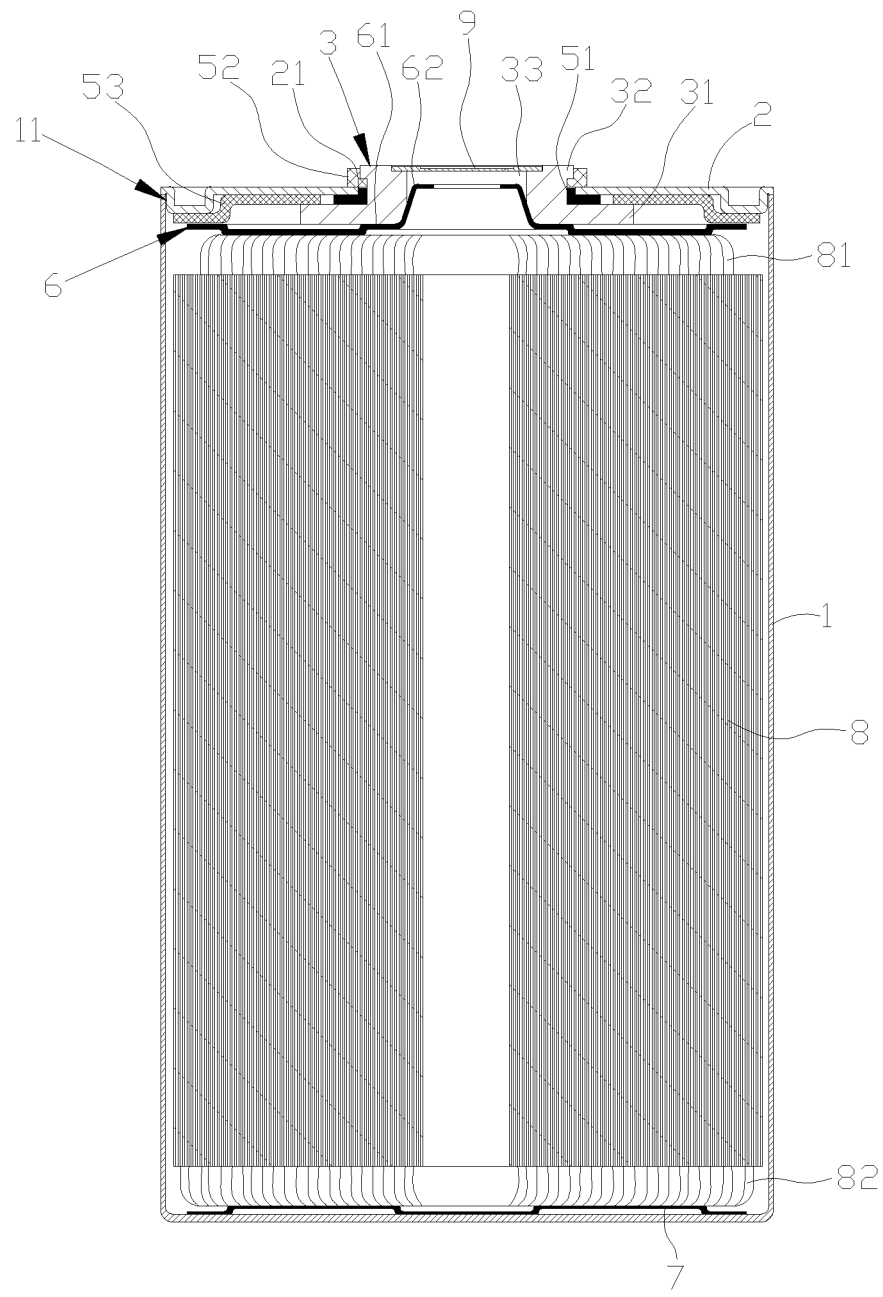
FIG. 10 is a schematic cross-sectional view of a battery assembly in a seventh embodiment of the application.

As shown in FIG. 10, a battery assembly provided in a seventh embodiment of the application is basically the same as the battery assembly in the fifth embodiment, and the pole 3 also has an inverted T-shaped structure, except that that the pressing block 4 is not provided on the pole 3. Therefore, the insulating ring 52 is directly clamped between the flange 32 and the cover plate 2.

Figure 11:
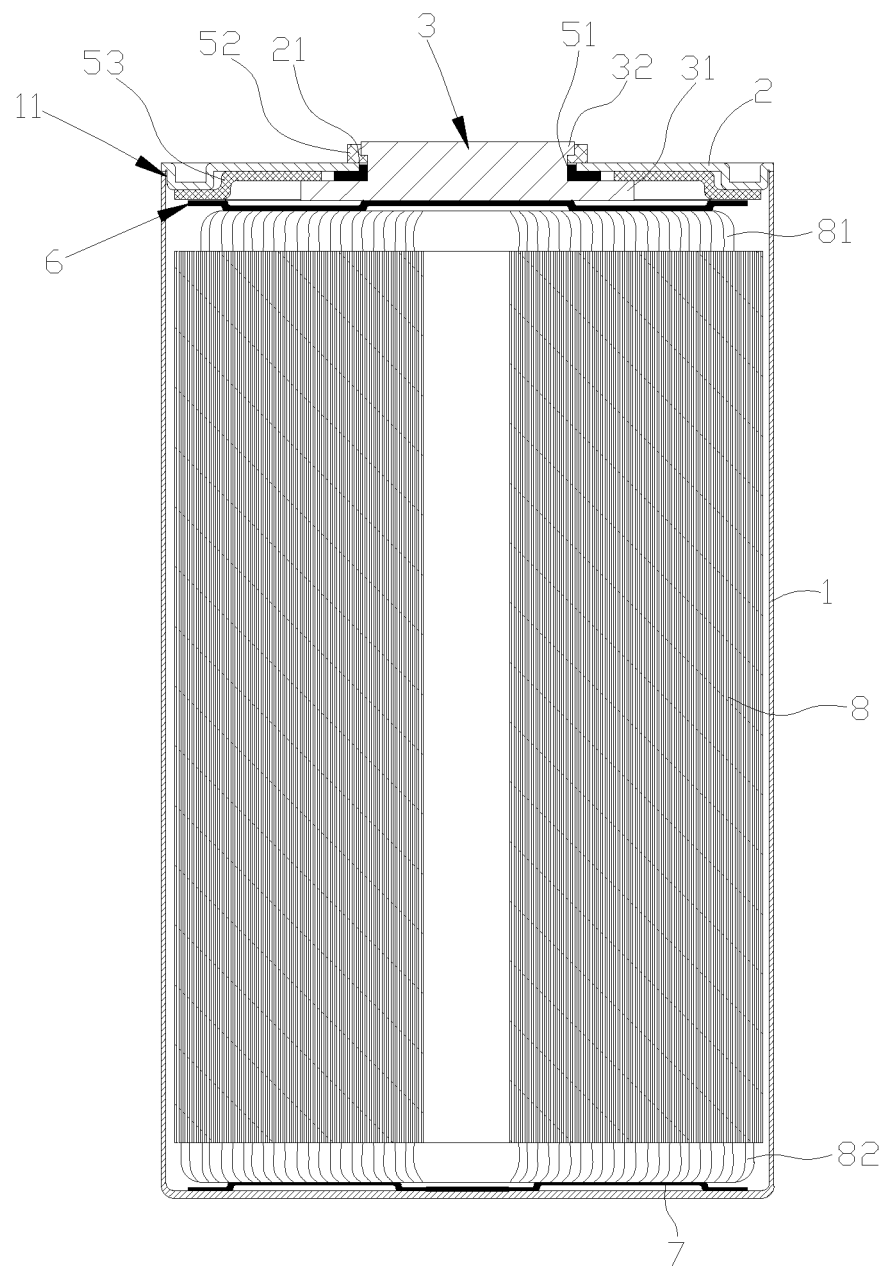
FIG. 11 is a schematic cross-sectional view of a battery assembly in an eighth embodiment of the application.

As shown in FIG. 11, a battery assembly provided in an eighth embodiment of the application is basically the same as the battery assembly in the fifth embodiment, and the pole 3 also has an inverted T-shaped structure, except that the structures of the pole 3 and the first current collecting plate 6 are different, and the pressing block 4 is not provided on the pole 3. Specifically, in this embodiment, the first current collecting plate 6 is a flat disc-shaped structure, the pole 3 is a solid block (i.e., the central hole 33 is not provided in the pole 3), and the first current collecting plate 6 is in contact with the bottom surface of the pole 3. Furthermore, the insulating ring 52 is directly clamped between the flange 32 and the cover plate 2.

As shown in FIGS. 1A and 1B, the first embodiment of the application further provides a battery, which particularly may be a cylindrical battery. The battery includes the battery assembly as described above and a housing 1. The housing 1 has a cylindrical hollow structure. The top of the housing 1 is provided with an opening 11. The cover plate 2 is used to seal the opening 11 of the housing 1, and the cover plate 2 is fixed at the opening 11 of the housing 1. The cover plate 2 is electrically connected with the housing 1. The opposite ends of the pole 3 are respectively located outside the opening 11 of the housing 1 and inside the opening 11 of the housing 1.

As another embodiment, the top of the cylindrical battery is provided with a groove (not shown), and the pole 3 is inserted in the groove. In addition, the groove can further be sleeved with an insulating sealing ring 51 with an appropriate size.

As shown in FIGS. 1A and 1B, in one embodiment, the battery further includes a first current collecting plate 6, a second current collecting plate 7 and a cell 8. The first current collecting plate 6, the second current collecting plate 7 and the cell 8 are all arranged in the housing 1. The first current collecting plate 6 is located between the top end of the cell 8 and the pole 3, and two sides of the first current collecting plate 6 are electrically connected with the top end of the cell 8 and the pole 3, respectively. The second current collecting plate 7 is located between the bottom end of the cell 8 and the housing 1, and two sides of the second current collecting plate 7 are electrically connected with the bottom end of the cell 8 and the housing 1, respectively.

As shown in FIGS. 1A and 1B, in one embodiment, two sides of the first current collecting plate 6 are respectively in contact with the top end of the cell 8 and the pole 3 to realize the electrical connection, and two sides of the second current collecting plate 7 are respectively in contact with the bottom end of the cell 8 and the housing 1 to realize the electrical connection.

As shown in FIGS. 1A, 1B and 4, in one embodiment, the first current collecting plate 6 includes a plate body 61 and an electrical connection part 62. The electrical connection part 62 protrudes from the plate body 61 towards the pole 3, and the plate body 61 is in contact with the end face of the cell 8. The pole 3 is provided with a central hole 33, the electrical connection part 62 is inserted into the central hole 33, and the side wall of the electrical connection part 62 is in contact with the inner wall of the central hole 33.

As shown in FIGS. 1A and 1B, in one embodiment, two ends of the cell 8 are respectively provided with a positive tab 81 and a negative tab 82. The pole 3 is a positive pole, the first current collecting plate 6 is a positive current collecting plate, and the second current collecting plate 7 is a negative current collecting plate, so that two sides of the first current collecting plate 6 are respectively in contact with the positive tab 81 of the cell 8 and the pole 3, and two sides of the second current collecting plate 7 are respectively in contact with the negative tab 82 of the cell 8 and the bottom wall of the housing 1. Of course, in other embodiments, the pole 3 may be a negative pole, the first current collecting plate 6 is a negative current collecting plate, and the second current collecting plate 7 is a positive current collecting plate, so that two sides of the first current collecting plate 6 are respectively in contact with the negative tab 82 of the cell 8 and the pole 3, and two sides of the second current collecting plate 7 are respectively in contact with the positive tab 81 of the cell 8 and the bottom wall of the housing 1.

Specifically, when the pole 3 is a positive pole, the housing 1 can be a steel housing (of course, it can also be other materials), and at this time, the pole 3 is used as the positive electrical connection terminal of the battery, and the housing 1 and the cover plate 2 are used as the negative electrical connection terminal of the battery. When the pole 3 is a negative pole, the housing 1 can be an aluminum housing, and at this time, the pole 3 is used as the negative electrical connection terminal of the battery, and the housing 1 and the cover plate 2 are used as the positive electrical connection terminal of the battery. In this embodiment, the pole 3 and the cover plate 2 are respectively used as the positive electrical connection terminal and the negative electrical connection terminal (or the pole 3 is used as the negative electrical connection terminal and the cover plate 2 is used as the positive electrical connection terminal), so as to lead the positive and negative poles of the battery to the same side of the battery. Compared with the design that the positive electrical connection terminal and the negative electrical connection terminal are respectively arranged at opposite ends of the battery, it is conducive to the grouping of the battery and can facilitate the arrangement of the battery, reduce the number of structural parts when the battery is grouped, simplify the wiring design of BMS (battery management system), reduce the cost, make the arrangement of the battery more compact and improve the energy density of the battery.

As shown in FIGS. 1A and 1B, in one embodiment, the positive tab 81 and the negative tab 82 of the cell 8 adopt the design of full tabs. The first current collecting plate 6 and the positive tab 81, or the second current collecting plate 7 and the negative tab 82 can be fixed by welding.

In one embodiment, an electrolyte solution is further provided in the housing 1 to charge or discharge the battery through the positive and negative plates of the cell 8 and the electrochemical reaction of the electrolyte solution. The electrolyte solution can be formed from organic solvents such as EC, PC, DEC, EMC and EMC and lithium salts such as LiPF6 or LiBF4. The electrolyte can be liquid, solid or gel state.

The first embodiment of the application further provides a preparation method of the battery assembly, which includes:
 providing a cover plate 2 and a pole 3;
 penetrating the pole 3 through the cover plate 2; and
 fixing the pole 3 with the cover plate 2 by riveting.

In one embodiment, the cover plate 2 is provided with a through hole 21, the pole 3 has a first end 30B and a second end 30C arranged opposite to each other, and the first end 30B of the pole 3 is provided with a stopping part 31.

Specifically, said penetrating the pole 3 through the cover plate 2 includes:
 inserting the pole 3 into the through hole 21 of the cover plate 2 until the second end 30C of the pole 3 penetrates the cover plate 2.

Specifically, said fixing the pole 3 with the cover plate 2 by riveting includes:
 mechanically pressing the second end 30C of the pole 3 to form a flange 32, such that the pole 3 is fixed with the cover plate 2 by the riveting, and the stopping part 31 and the flange 32 cooperate with each other to clamp the cover plate 2 therebetween.

The battery assembly and the battery provided by the embodiment of the application have the following advantages:

1. The riveting of the pole 3 and the cover plate 2 not only simplifies the operation, improves the production efficiency, but also reduces the production cost;
2. By using the pole 3 and the cover plate 2 respectively as the positive and negative electrical connection terminals (or using the pole 3 as the negative electrical connection terminal and the cover plate 2 as the positive electrical connection terminal), the positive and negative poles of the battery are led out to the same side of the battery, which is conducive to the grouping of the battery and can facilitate the arrangement of the battery, reduce the number of structural parts when the battery is grouped, simplify the wiring design of BMS (battery management system), reduce the cost, make the arrangement of batteries more compact and improve the energy density of battery;
3. By setting the electrical connection part 62 on the first current collecting plate 6, the contact area between the first current collecting plate 6 and the pole 3 is increased, so that the heat generated inside the cell 8 can be quickly conducted from the pole 3, so as to avoid the thermal runaway caused by large heat generation of the cell 8 during high rate charge and discharge;
4. When the pole 3 is riveted with the cover plate 2, the pole 3 will squeeze the insulating sealing ring 51 during the upsetting process of the pole 3, so that the insulating sealing ring 51 is compressed, so as to improve the sealing effect of the insulating sealing ring 51. Thus, the insulating sealing ring 51 has good sealing performance and is durable, and can prevent the problem of liquid leakage in the long-term use of the battery and increase the service life of the battery;
5. By setting the pressing block 4, the insulating gasket 53 can be prevented from being fractured or broken during the upsetting process of the pole 3 to affect the tightness of the battery. In the upsetting process, because the contact area between the formed flange 32 and the insulating gasket 53 is small, it is easy to crush or fracture the insulating gasket 53. When the pressing block 4 is added, the contact area between the pressing block 4 and the insulating gasket 53 increases because the surface area of the pressing block 4 is larger than that of the flange 23. In addition, since the pressing block 4 has a certain elasticity, the pressing block 4 can further buffer the pressure on the insulating gasket 53 during upsetting. Therefore, by setting the pressing block 4, the contact area with the insulating gasket 53 is increased and plays a buffer role, which greatly reduces the pressure on the insulating gasket 53 during upsetting, so as to improve the sealing performance of the battery.

The above is only the specific embodiments of the application, but the protection scope of the application is not limited to this. Any person skilled in the technical field can easily think of changes or replacements within the technical scope disclosed by the application, which should also be covered by the protection scope of the application. Therefore, the protection scope of the application shall be defined by the appended claims.

What is claimed is:

1. A battery assembly comprising a cover plate (2) and a pole (3), wherein the pole (3) penetrates the cover plate (2) and is fixed with the cover plate (2) by riveting; the cover plate (2) is provided with a through hole (21), the pole (3) comprises a main body (30A) and a first end (30B) and a second end (30C) respectively located at opposite ends of the main body (30A), the first end (30B) of the pole (3) is provided with a stopping part (31), and the stopping part (31) exists before the pole (3) and the cover plate (2) are riveted, the main body (30A) is inserted in the through hole (21), the second end (30C) of the pole (3) is mechanically pressed during the riveting process when the pole (3) and the cover plate (2) are riveted to form a flange (32) at the second end (30C) of the pole (3) so that the cover plate (2) is clamped between the stopping part (31) and the flange (32) by riveting, wherein a diameter of the stopping part (31) is greater than that of the flange (32), with the stopping part (31) provided at a top of the pole (3) and the flange (32) provided at a bottom of the pole (3);

the battery assembly further comprises a pressing block (4) and an insulating gasket (53), the pressing block (4) and the insulating gasket (53) are overlapped and laminated with each other along an axial direction of the pole (3) and sleeved on the second end (30C) of the pole (3), the pressing block (4) is clamped between the flange (32) and the insulating gasket (53), and the insulating gasket (53) is clamped between the pressing block (4) and the cover plate (2);

wherein the flange (32), the pressing block (4) and the insulating gasket (53) are located on an inner side of the cover plate (2), while the stopping part (31) is located on an outer side of the cover plate (2);

the battery assembly further comprises a first current collecting plate (6), the first current collecting plate (6) comprises a plate body (61) and an electrical connection part (62), the electrical connection part (62) is formed by protruding from the plate body (61) towards the pole (3), the electrical connection part (62) has a circular cross section, and the electrical connection part (62) has a structure of a hollow truncated cone with a gradually reduced diameter along a direction toward the pole (3);

the pole (3) is provided with a central hole (33), an inner wall of the central hole (33) is provided with an inclined surface (34) at the second end (30C) of the pole (3), the electrical connection part (62) is inserted into the central hole (33), and an outer peripheral wall of the electrical connection part (62) is in contact with the inclined surface (34) of the central hole (33) to realize an electrical connection between the electrical connection part (62) and the pole (3);

a first opening (35) is provided at an end face of the first end (30B) of the pole (3) such that the central hole (33) is capable of communicating with an external environment through the first opening (35), a second opening (63) is provided at an end face of the electrical connection part (62), and the second opening (63) communicates an interior of the electrical connection part (62) with the central hole (33), wherein the first opening (35) has a diameter greater than the second opening (63), and the central hole (33) has a diameter greater than the second opening (63), the first opening (35) is located above and spaced from the second opening (63), and the second opening (63) is communicated with the first opening (35) through the central hole (33);

the battery assembly further comprises a sealing sheet (9), the sealing sheet (9) is connected with the first end (30B) of the pole (3) and hermetically seals the first opening (35).

2. The battery assembly according to claim 1, wherein the battery assembly further comprises an insulating sealing ring (51) located on the outer side of the cover plate (2), the insulating sealing ring (51) is sleeved on the pole (3), and the insulating sealing ring (51) is used for insulation and sealing between the pole (3) and the cover plate (2).

3. The battery assembly according to claim 1, wherein the pole (3) is a positive pole or a negative pole.

4. A battery comprising the battery assembly according to claim 1.

5. The battery according to claim 4, wherein the battery further comprises a housing (1), at least one end of the housing (1) is provided with an opening (11), the cover plate (2) is used to seal the opening (11) of the housing (1), the opposite ends of the pole (3) are respectively located outside the opening (11) of the housing (1) and inside the opening (11) of the housing (1).

6. The battery according to claim 5, wherein the battery further comprises a second current collecting plate (7) and a cell (8), and the first current collecting plate (6), the second current collecting plate (7) and the cell (8) are arranged in the housing (1), two sides of the first current collecting plate (6) are electrically connected with the pole (3) and a top end of the cell (8) respectively, and two sides of the second current collecting plate (7) are electrically connected with the housing (1) and a bottom end of the cell (8) respectively.

7. An electric vehicle comprising the battery according to claim 4.

8. The battery assembly according to claim 2, wherein a portion of the insulating sealing ring (51) is located in the through hole (21) and sandwiched between an outer wall of the pole (3) and an inner wall of the through hole (21), and another portion of the insulating sealing ring (51) is located on the outer side of the cover plate (2) and sandwiched between the stopping part (31) and the cover plate (2).

9. The battery assembly according to claim 2, wherein the battery assembly further comprises an insulating ring (52) located on the outer side of the cover plate (2), the insulating ring (52) is sandwiched between the stopping part (31) and the cover plate (2), and the insulating ring (52) is used to insulate the pole (3) from the cover plate (2), wherein the insulating ring (52) has a larger diameter than the insulating sealing ring (51) so that the insulating ring (52) is arranged around a periphery of the insulating sealing ring (51).

10. The battery assembly according to claim 1, wherein the pressing block (4) is an aluminum block.

11. The battery assembly according to claim 1, wherein a lower portion of the outer peripheral wall of the electrical connection part (62) is in contact with the inclined surface (34) of the central hole (33) to realize the electrical connection between the electrical connection part (62) and the pole (3), while an upper portion of the outer peripheral wall of the electrical connection part (62) is spaced from the inner wall of the central hole (33) to form a V-shaped groove (64) therebetween.

* * * * *